United States Patent Office 3,271,461
Patented Sept. 6, 1966

3,271,461
SUBSTITUTED ALLYL ETHERS
Robert James Stephenson, Llanyravon, Cumbran, England, assignor to Monsanto Chemicals Limited, London, England, a British company
No Drawing. Filed Oct. 30, 1962, Ser. No. 234,218
Claims priority, application Great Britain, Nov. 13, 1961, 40,502/61
5 Claims. (Cl. 260—614)

This invention relates to a process for the production of ethers, and in particular for the production of certain substituted allyl ethers.

Ethylenically unsaturated ethers are useful industrial products, owing to the reactivity of the ethylenic groups. Apart from general applications as chemical intermediates, such ethers are of some interest as monomers which can be polymerized, for instance with other unsaturated monomers, such as styrene, maleic anhydride or acrylonitrile.

Certain allyl ethers, in particular for instance an allyl ether which as well as containing an ethylenic group also contains a hydroxyl group, are of value as for example cross-linking agents in the production of many kinds of resins, such as polyester and alkyd resins. Moreover, polymers obtained from allyl ethers that also contain hydroxyl groups have hydrophilic properties, and can be made use of in certain specialized applications, for instance as stabilizers in an emulsion polymerization process.

A very effective method of making certain substituted allyl ethers has now been found.

In copending applications S.N. 123,132, filed July 11, 1961, now abandoned and S.N. 149,219, filed November 1, 1961, there are claimed processes for the preparation of allyl ethers wherein, respectively, an allyl alcohol is co-reacted either with itself or with an aliphatic alcohol and a diallyl ether is co-reacted with an aliphatic alcohol, both processes employing, as catalyst, a combination of a cuprous salt and an acid co-catalyst. The object of the present application is to provide an alternate, and in certain instances, a more expedient route to certain of these allyl ethers, i.e., to substituted allyl ethers. Other objects of this invention will in part be obvious and will in part appear hereinafter.

These and other objects are attained by contacting a conjugated diene with an organic compound containing at least one hydroxyl group in the presence of a cuprous salt catalyst and an acid co-catalyst.

The following examples are presented in illustration of the invention are not intended as limitations thereof.

Example I

This example describes the production of n-butyl α-methallyl ether and n-butyl crotyl ether by the reaction of butadiene with n-butanol in the presence of cuprous bromide and an addition-product of hydrogen bromide and butadiene.

Butadiene is first treated with hydrogen bromide by passing dry hydrogen bromide gas into liquid butadiene until no more of the gas is absorbed.

13.4 grams of the resulting liquid (which is the acid co-catalyst) are placed in a beverage bottle, and 74 grams of n-butanol, 57 grams of cold liquid butadiene and 7 grams of cuprous bromide are added. The bottle is then sealed by means of a Crown-cap, and shaken at 60° C. for 110 hours.

The bottle is allowed to cool, and opened. The liquid contents are decanted from the residual copper salt, and placed in a flask fitted with a reflux condenser and water-separating still-head. 55 grams of benzene, 7 grams of sodium hydroxide and 16 cc. of water are added and the mixture is boiled for 2 hours. The liquid is then cooled, decanted from the solid material and returned to the cleaned flask. 13 grams of boric acid are added, the reflux condenser and still-head are refitted, and the mixture is again boiled until 9 grams of water have been collected. The flask is then arranged for normal distillation, and the benzene is distilled off, followed by 82 grams of a mixture of n-butyl α-methallyl ether and n-butyl crotyl ether, boiling between 100° C. and 150° C. This is dried over phosphorus pentoxide and fractionally distilled from barium oxide. The yield consists of about 45 grams of n-butyl α-methallyl ether (B.P. 124° C., $n_D{}^{25}=1.4045$) and about 31 grams of n-butyl crotyl ether (B.P. 145° C., $n_D{}^{25}=1.4120$).

Example II

Example I is repeated using 5.0 grams (ca. 20 milli-equivalents) of Zeocarb SRC/225/16 (a sulphonated polystyrene cross-linked with 8% by weight of divinylbenzene) in place of the butadiene-hydrogen bromide coreaction product employed therein. The product is again a separable mixture of n-butyl α-methallyl ether and n-butyl crotyl ether.

Example III

This example describes the production of ethyl α-methallyl ether and ethyl crotyl ether by the reaction of butadiene with ethyl alcohol in the presence of cuprous bromide and hydrogen bromide.

A mixture of 57 grams of ethanol, 12 grams of hydrobromic acid, 100 grams of butadiene and 4.2 grams of cuprous bromide are shaken in a sealed bottle at 60° C. for 70 hours.

The bottle is allowed to cool, and opened. The contents are then warmed to 40° C. until all the excess butadiene has evaporated, and washed three times with 50 cc. portions of saturated sodium chloride solution. The product is then distilled rapidly, the fraction boiling between 60° C. and 100° C. being collected and dried over phosphorus pentoxide to yield about 70 grams of a crude product consisting essentially of a mixture of ethyl α-methallyl ether and ethyl crotyl ether.

The crude product is added to a solution of 3.3 grams of sodium in 30 grams of ethanol, and the mixture is boiled under reflux for 1½ hours, allowed to cool, washed three times with 50 cc. portions of saturated sodium chloride solution, dried over phosphorus pentoxide and again distilled. Finally, on fractional distillation there are obtained about 30 grams of ethyl α-methallyl ether (B.P. 79.80° C., $n_D{}^{25}=1.3902$) and about 30 grams of ethyl crotyl ether (B.P. 100° C., $n_D{}^{25}=1.4044$).

Example IV

Example III is repeated using 5.0 grams of cuprous sulphate in place of the cuprous bromide employed therein. The product is again a separable mixture of ethyl α-methallyl ether and ethyl crotyl ether.

Example V

Example III is repeated using 5.0 grams of cuprous p-toluene sulphonate and 8 grams of p-toluenesulphonic acid, respectively, in place of the cuprous bromide and hydrobromic acid employed therein. The product is again a separable mixture of ethyl α-methallyl ether and ethyl crotyl ether.

Example VI

This example describes the production of 2-chloroethyl α-methallyl ether and 2-chloroethyl crotyl ether by the reaction of butadiene with 2-chloroethanol in the presence of cuprous chloride and hydrogen chloride.

A mixture of 80 grams of 2-chloroethanol, 11 grams of concentrated hydrochloric acid, 54 grams of butadiene and 1.98 grams of cuprous chloride are shaken in a sealed bottle at 60° C. for 110 hours.

The bottle is allowed to cool, and opened. The liquid contents are then decanted from residual cuprous chloride, 100 grams of benzene and 30 grams of boric acid are added, and the mixture is boiled under reflux for 6 hours. This removes unreacted 2-chloroethanol. The residue is distilled at atmospheric pressure, the fraction boiling between 130° C. and 170° C. being collected to yield a crude product consisting mainly of a mixture of 2-chloroethyl α-methallyl ether and 2-chloroethyl crotyl ether.

The crude product is fractionally distilled, there being obtained about 21.7 grams of 2-chloroethyl α-methallyl ether (B.P. 139° C.) and about 18.4 grams of 2-chloroethyl crotyl ether (B.P. 159° C.).

*Example VII*

Example VI is repeated using 6.0 grams of boron trifluoride in place of the hydrochloric acid employed therein. The product is again a separable mixture of 2-chloroethyl α-methallyl ether and 2-chloroethyl crotyl ether.

*Example VIII*

This example describes the production of a mixture of partially etherified polyethylene glycols by the reaction of butadiene with polyethylene glycol in the presence of cuprous chloride and hydrogen chloride.

A mixture of 100 grams of a polyethylene glycol of average molecular weight 200, 11 grams of concentrated hydrochloric acid, 54 grams of butadiene and 1.98 grams of cuprous chloride are shaken in a sealed bottle at 60° C. for 72 hours.

The bottle is allowed to cool, and opened. The liquid contents are decanted into a flask, and volatile material is distilled off by heating to 100° C. under a reduced pressure of 5 cm. of mercury. The residue consists of about 118 grams of a mixture of partial α-methallyl and crotyl ethers of the polyethylene glycol. This gain in weight corresponds to a reaction of about 30% of the available hydroxyl groups on the polyethylene glycol, and this is confirmed by the fact that the product is found to have an iodine number of about 84.

The process of this invention, as exemplified by the foregoing examples comprises contacting a conjugated diene with an organic compound containing at least one hydroxyl group in the presence of a cuprous salt catalyst and an acid co-catalyst.

The process works very well with butadiene, but other conjugated dienes also give good results. These are in effect substitution products of butadiene, with one or more of the hydrogen atoms replaced by a hydrocarbon group or other substituent. Where the substituent is a hydrocarbon group, this can for example be an aliphatic group with either a straight or branched chain, and is preferably saturated. Thus, the conjugated diene can be a derivative of butadiene substituted by an alkyl group such as methyl, ethyl, propyl, butyl, amyl, hexyl, octyl or higher alkyl group. Alternatively, the conjugated diene can contain an alicyclic group for example a cyclopentyl, cyclohexyl, or alkylcyclohexyl group, an aralkyl group such as a benzyl or a β-phenethyl group, or an aryl group such as a phenyl, tolyl, or xylyl group.

When the conjugated diene contains a substituent other than a hydrocarbon group, this is preferably one which is inert, that is one which remains substantially unaffected during the reaction. Examples of this type of substituent are an alkoxy group such as an ethoxy or methoxy group, and a halogen atom such as a chlorine or bromine atom.

Either or both of the double bonds in the conjugated diene can form part of an alicyclic ring; the diene can for example be a vinylcyclopentene, a vinylcyclohexene, a vinylcycloheptene, or cyclohexadiene.

The following are specific examples of conjugated dienes which can be employed in the process of the invention; substituting them for the butadiene employed in the example with equivalent results: isoprene; hexa-1,3-diene; 5-methylhepta-1,3-diene; 1-phenylbuta-1,3-diene; 5-cyclohexyl - 3 - methylpenta - 1,3 - diene; ethyl-penta-3,5-dienyl ether; chloroprene and vinylcyclohexene; etc.

The organic compound containing a hydroxyl group is preferably an alcohol, although a phenol can be employed. Where it is an alcohol this can be chosen from a wide range, including mono- and polyhydric alcohols; it is preferably a primary or secondary alcohol.

Thus, the alcohol can be, for instance, an aliphatic alcohol having either a straight or branched carbon chain which can, for example, be fully saturated or contain one or more multiple carbon-carbon bonds, or be interrupted by other atoms such as oxygen or sulphur, or carry one or more substituent atoms or groups other than the alcoholic hydroxyl group, for example a halogen atom or an alkoxy group. Any of the following hydroxyl compounds may be substituted for that employed in the foregoing examples with equivalent results.

Examples of such aliphatic alcohols that are monohydric include methanol, ethanol, n- and iso-propanol, n-, iso-, and s-butanol; amyl, hexyl, octyl, nonyl, decyl, dodecyl and hexadecyl alcohols; 3-buten-1-ol and 4-penten-2-ol; oleyl alcohol; 2-chloroethanol; 1-bromopropan-2-ol; ethylene glycol monobutyl ether; diethylene glycol monoethyl ether; etc.

Other useful aliphatic alcohols also include the alicyclic alcohols, for example cyclopentanol, cyclohexanol, cyclohex - 3 - en - 1 - ol; 2 - ethylcyclohexanol, and 4-chlorocyclohexanol, as well as aralkyl alcohols, for example benzyl alcohol and nuclear substituted benzyl alcohols.

Examples of alcohols that are polyhydric include dihydric alcohols, such as ethylene or propylene glycol; polyethylene glycols of the general formula

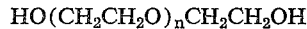

$$HO(CH_2CH_2O)_nCH_2CH_2OH$$

where $n$ is for instance an integer from 1 to 10, for example propane - 1,2 - diol, propane - 1,3 - diol, butane-1,4 - diol, 3 - methylpentane - 2,5 - diol and hexamethylene glycol; trihydric alcohols, for instance glycerol; tetrahydric alcohols, for instance erythritol and pentaerythritol; pentahydric alcohols, for instance arabinol; hexahydric alcohols, for instance mannitol and sorbitol; and carbohydrates, for instance glucose and sucrose.

Where the organic compound containing a hydroxyl group is a phenol, this can for example be phenol itself, or a phenol in which the benzene nucleus carries a substituent such as an alkyl group, a halogen atom or an alkoxy group. Naphthols and other phenols that are useful include phenol, the cresols, the xylenols, p-chloro-m-xylenol, β-naphthol and o-phenylphenol.

The reaction usually results in a mixture of two isomeric products which can be separated if desired. Examples of allyl ethers that can be produced by the process of the invention include methyl crotyl ether, methyl α-methallyl ether, butyl crotyl ether, butyl α-methallyl ether, the dicrotyl ether of 1,3-propanediol, benzyl α-ethallyl ether, phenyl α-methallyl ether, butyl β-methylcrotyl ether and butyl-δ-chlorocrotyl ether. Conventional separation techniques such as, for example, fractional distillation may be employed.

The cuprous salt catalyst can, for example, be a cuprous halide, such as the chloride or bromide, cuprous sulphate or cuprous p-toluenesulphonate as shown in the examples. However, it has been found that other cuprous salts may be employed with equivalent results, for example, cuprous acetate, cuprous ammonium iodide, cuprous arsenide, cuprous carbonate, cuprous cyanide, cuprous ferricyanide, cuprous sulfide, cuprous sulfite, cuprous iodide, cuprous fluoride, etc.

The acid co-catalyst is preferably a hydrogen halide such as, for example, hydrogen bromide or hydrogen chloride; other inorganic acids can be employed, for instance phosphoric acid. Other acid co-catalysts that can be used include Lewis acids such as for instance a halide of an element in Group 3 of the Periodic Table, for example, boron trifluoride or aluminum chloride; sulphonic acids, for instance inorganic sulphonic acids, for example, sulphuric acid or sulphamic acid, as well as organic sulphonic acids, such as benzenesulphonic acid; p-toluenesulphonic acid, methanesulphonic acid or ethyl hydrogen sulphate; or a resin containing a plurality of sulphonic acid groups, for instance a sulphonated styrene polymer or copolymer, several of which are available commercially as ion-exchange resins. The sulphonated resins are particularly effective as co-catalysts in the process of the invention, as are other acid ion-exchange resins. Many acids, particularly the preferred hydrogen halides, react with conjugated dienes to form addition products which can act as a source of acid in the process of the invention; these addition products are therefore in practice acid cocatalysts, and they are in fact very convenient co-catalysts to use. When such an addition product is used, it is preferable to employ one made from the same diene as that employed as reactant.

The cuprous salt is usually added to the reaction mixture as the powdered solid, although it can in appropriate instances be formed in situ from copper powder or cuprous oxide or hydroxide and the acid which is employed as the co-catalyst. It is also possible to introduce the cuprous salt as a complex such as a halocuprous acid, or as an ion-exchange resin in which cuprous ions from a cuprous salt have displaced hydrogen ions originally present in an acidic ion-exchange resin. Particularly useful is a resin containing a plurality of sulphonic groups some of which are present as cuprous sulphonate groups and the remainder as sulphonic acid groups; the resin can accordingly function as both catalyst and co-catalyst.

The acid co-catalyst can be added as a solid or liquid (in instances where these forms are appropriate). Thus, the co-catalyst can be in solution, for instance either aqueous or in one or both of the reactants. In solution in an alcohol the co-catalyst will sometimes be present to some extent as an ester; thus, a solution of sulphuric acid in ethanol will contain ethyl hydrogen sulphate. If desired, the acid co-catalyst can be added in the form of a hydrolyzable organic ester such as for instance a sulphate. Boron trifluoride is most conveniently introduced as a complex such as that with ethyl ether or with ethyl acetate.

The proportion of cuprous salt employed relative to the amount of the conjugated diene can be as much as 0.5 mol per mol of diene but such large amounts are generally unnecessary since as little as 0.00001 mol per mol of diene can be effective in some instances. Generally, a molar ratio of cuprous salt to diene within the range 0.001:1 to 0.1:1 is preferred, for example from 0.01:1 to 0.05:1.

The ratio of acid co-catalyst to cuprous salt employed can vary over a wide range, for instance from about 0.1 to about 50 equivalents of the acid per mol of cuprous salt. The preferred range of ratios is generally from 0.2 to 10 equivalents of the acid per mol of cuprous salt, and mixtures having a number of equivalents of acid with the range 0.4 to 7.5, for example 0.5, 1, 2, 3 and 5, per mol of cuprous salt have been employed very successfully. A resin which can function as both catalyst and co-catalyst and in which there are, for instance, three equivalents of acid per mol of cuprous salt, can be obtained by treating a resin containing a plurality of sulphonic acid groups with a quantity of a cuprous salt sufficient to displace one quarter of the original number of hydrogen ions by cuprous ions.

The diene and the hydroxyl-containing compound can be employed in equivalent molar amounts, or either can be in excess relative to the other. Whether in any particular instance an excess of one reactant should be employed will usually be determined by such factors as the relative costs of the two reactants, or the ease of isolation of the ether products in the presence of the unreacted excess, or, where the hydroxyl-containing compound is polyhydric, the degree of etherification required. An excess, if employed, can be as little as 10% or as much as perhaps 50%, 100% or 200%.

In general, the process of the invention is carried out under conditions where the reactants remain largely in the liquid phase. This condition is usually easier to obtain if the reaction is carried out under pressure, especially if the normal boiling point of the diene is lower than the reaction temperature. A pressure of up to 100 atmospheres, and especially about 10 atmospheres is usually sufficient, and this can readily be brought about by carrying out the reaction in a sealed vessel such as a crown-capped beverage bottle, a Carius tube or an autoclave. An inert solvent such as benzene or toluene can be added if desired.

The temperature of the reaction depends on several factors such as for example the nature of the reactants, the pressure of the reaction and the type of catalyst components employed. In general temperatures between 20° C. and 150° C. are suitable and especially between 60° C. and 100° C. Excellent results have been obtained by using temperatures between 60° C. and 70° C.

Where the required product is an allyl ether which as well as containing an ethylenic group also contains a hydroxyl group, the starting-materials are a conjugated diene and a polyhydric alcohol or phenol, and the process is operated so that etherification of the polyhydric alcohol or phenol is incomplete. The etherification of the polyhydric alcohol or phenol with the diene normally takes place in stages, and after the first hydroxyl group the reaction of a given hydroxyl group generally occurs considerably more slowly than the reaction of the preceding group. Frequently, this permits the selection of conditions, for example, in certain instances a moderately elevated reaction temperature of perhaps 60–90° C., where the reaction virtually ceases without any significant amount of a fully allylated product being formed, even in the presence of an excess of the diene. In other instances, a partially allylated product can be obtained simply by stopping the reaction at the appropriate stage, or for example, by employing a deficiency of the conjugated diene.

The complete etherification of a polyhydric alcohol or phenol with a conjugated diene to give a polyether is practical, but this often calls for the use of more drastic conditions, including, for example, a relatively high reaction temperature of perhaps 100–150° C.

When the reaction has been substantially completed, it can be terminated and the product isolated. In certain circumstances, for example, if the reaction is carried out continuously, it may be more expedient to terminate the reaction earlier and to separate and recycle unchanged starting materials. The reaction is generally terminated by evaporating the diene, if it is volatile at room temperature, but termination is in some cases more effectively carried out by removing the acid co-catalyst from the reaction system, conveniently by mechanical separation when the co-catalyst is an insoluble resin, by distillation when the acid forms a volatile ester, or in appropriate instances by neutralization of the acid with a base. Fractional distillation, optionally after filtration or washing to remove inorganic materials, is generally a convenient procedure for the separation and isolation of the required products. In general, however, any appropriate method of isolation can be employed, and such a method need not necessarily entail distillation.

It is obvious that many variations may be made in the products and process heretofore discussed without departing from the spirit and scope of this invention.

What is claimed is:

1. A process for the production of a substituted allyl ether, in which a conjugated diene is contacted with an organic compound containing a reactive hydroxyl group at a pressure of up to 100 atmospheres, a temperature of between about 20° C. and about 150° C., and in the presence of up to 0.5 mol of cuprous salt catalyst per mol of conjugated diene and 0.1 to 50 equivalents of acid co-catalyst per mol of cuprous salt catalyst; wherein the acid co-catalyst is selected from the group consisting of hydrogen bromide, hydrogen chloride, phosphoric acid, boron trifluoride, aluminum chloride, sulphuric acid, sulphamic acid, benzenesulfonic acid, p-toluenesulfonic acid, methanesulfonic acid, ethyl hydrogen sulfate, and sulfonated styrene ion exchange resins; wherein the cuprous salt catalyst is selected from the group consisting of cuprous halides, cuprous sulfate, cuprous p-toluenesulphonate, cuprous acetate, cuprous ammonium iodide, cuprous arsenide, cuprous carbonate, cuprous cyanide, cuprous ferricyanide, cuprous sulfide and cuprous sulfite; wherein the conjugated diene is selected from the group consisting of butadiene and substituted butadiene wherein the substituted groups are selected from the group consisting of alkyls of from 1 to 8 carbon atoms, aryls selected from the group consisting of phenyl, tolyl and xylyl; alkoxys selected from the group consisting of ethoxy and methoxy and halogens selected from the group consisting of chlorine and bromine; and wherein the organic compound containing a reactive hydroxyl group is selected from the group consisting of substituted and unsubstituted saturated monohydric aliphatic alkyl alcohols of from 1 to 18 carbon atoms, wherein the substituted groups are substituents selected from the group consisting of ethoxy, methoxy, chlorine and bromine; unsubstituted alkyl polyhydric alcohols containing from 2 to 5 hydroxyl groups and from 4 to 24 carbon atoms, and phenol and substituted phenol selected from the groups consisting of naphthol, cresol, xylenol, p-chloro-m-xylenol, β-naphthol and γ-phenylphenol.

2. A process according to claim 1, in which the conjugated diene is butadiene.

3. A process according to claim 1, in which the monohydric aliphatic alcohol is selected from the group consisting of ethanol, butanol and chloroethanol.

4. A process according to claim 1, in which the polyhydric alcohol is polyethylene glycol.

5. A process according to claim 1, in which the cuprous salt is a cuprous halide.

References Cited by the Examiner
UNITED STATES PATENTS

| | | | |
|---|---|---|---|
| 2,045,560 | 6/1936 | Fenske | 260—614 |
| 2,067,385 | 1/1937 | Evans et al. | 260—615 |
| 2,176,055 | 10/1939 | Britton et al. | 260—614 |
| 2,922,822 | 1/1960 | Beach | 260—615 X |

LEON ZITVER, Primary Examiner.

LORRAINE A. WEINBERGER, Examiner.

B. HELFIN, H. T. MARS, Assistant Examiners.